UNITED STATES PATENT OFFICE.

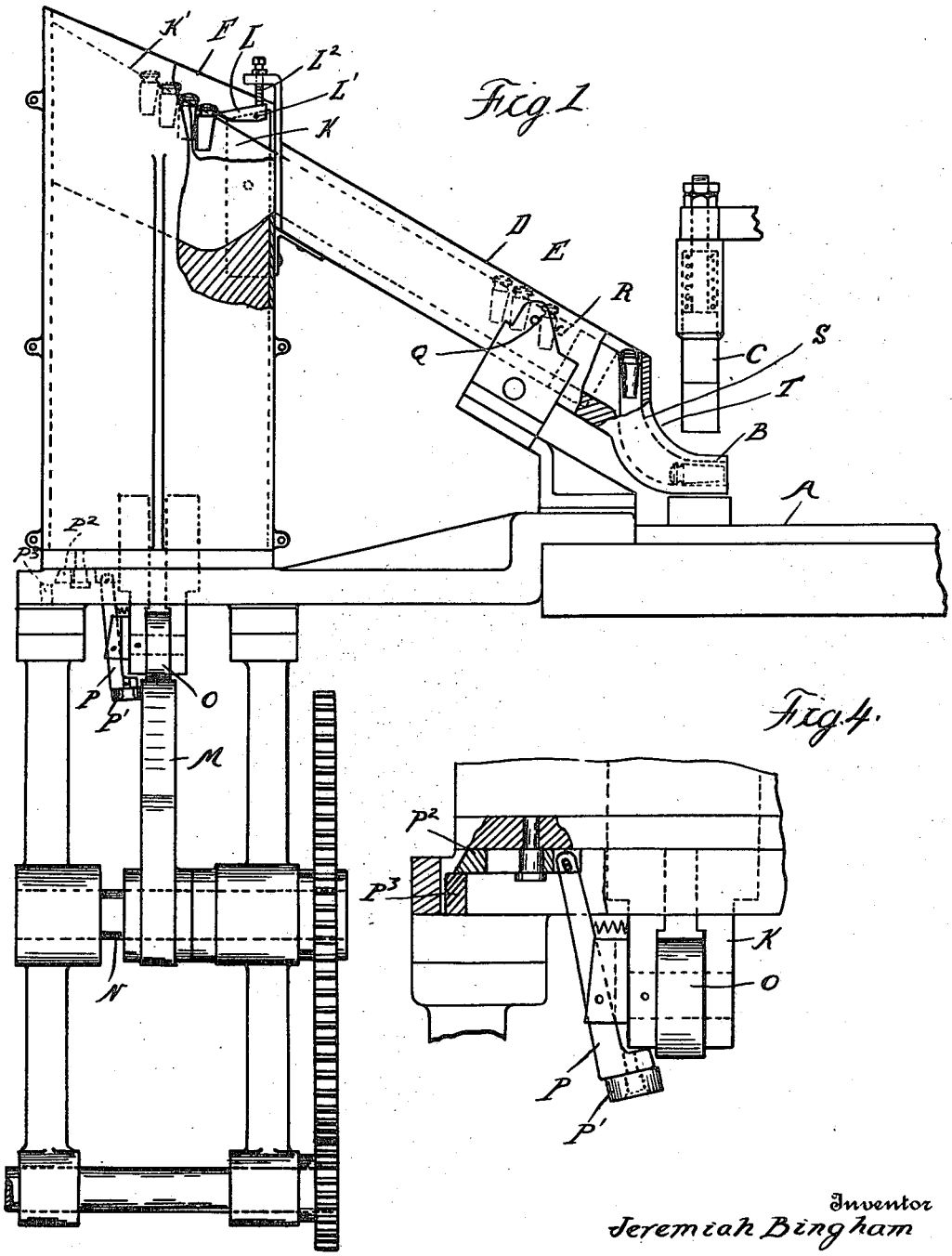

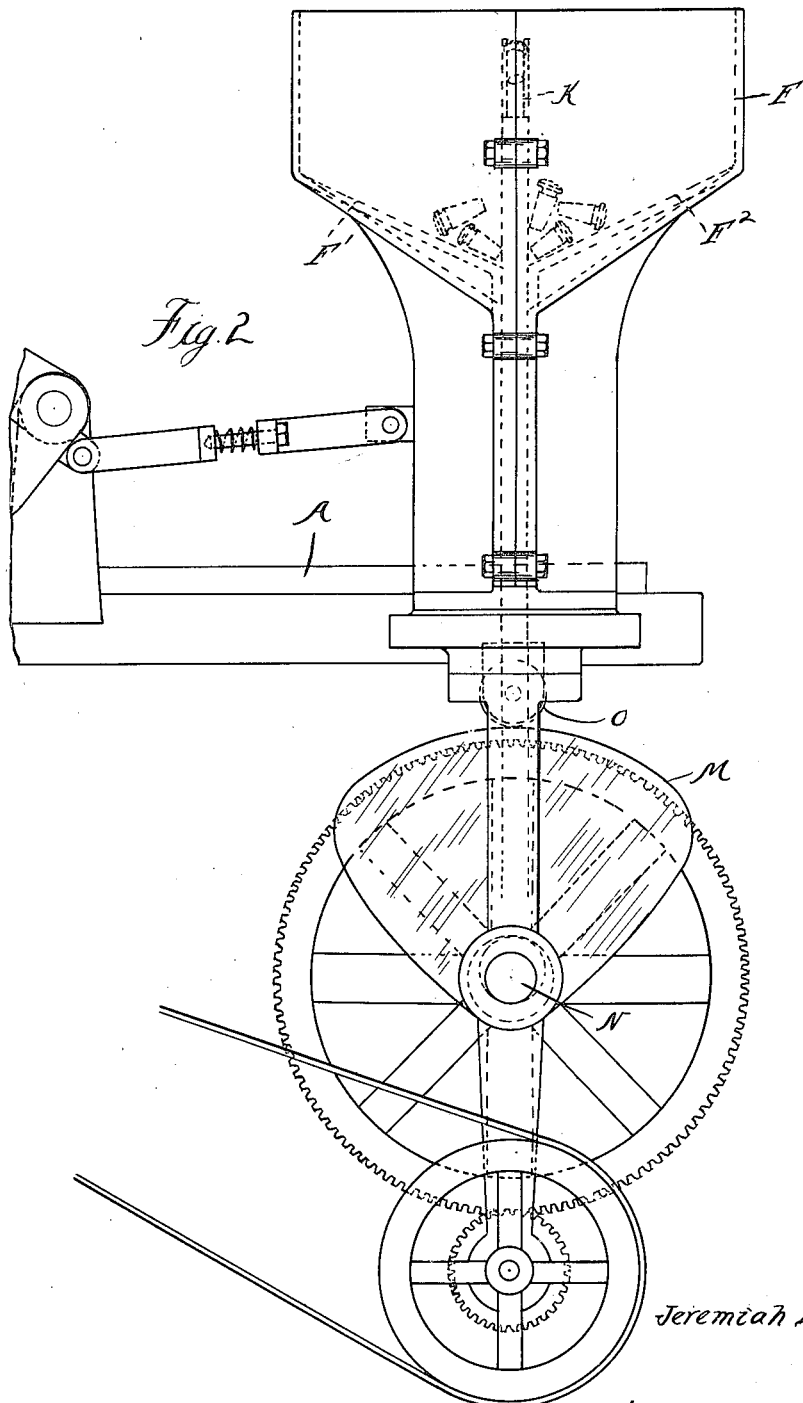

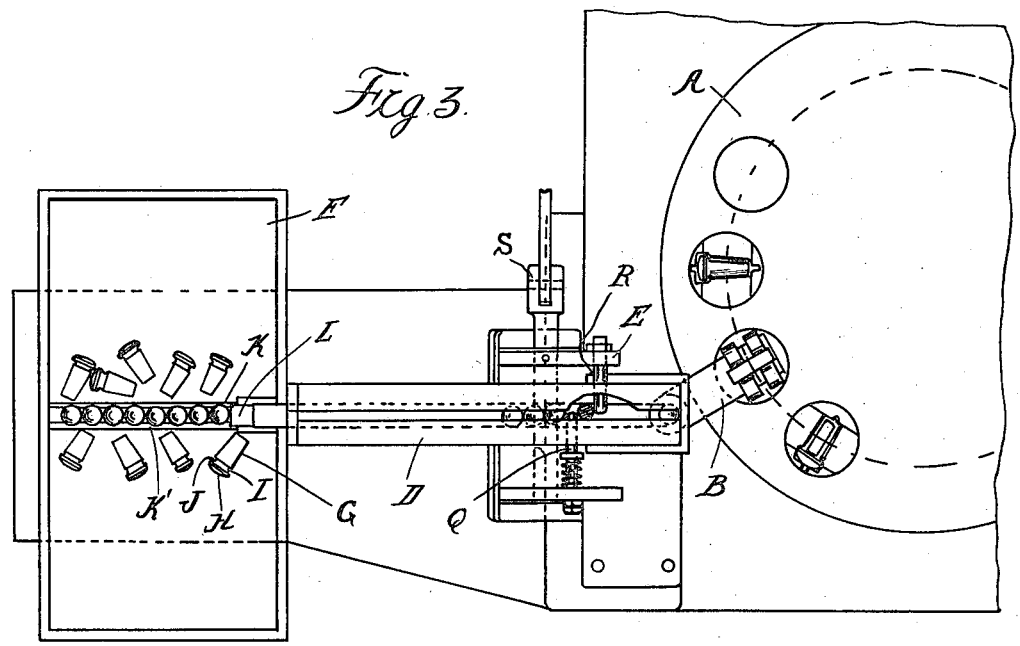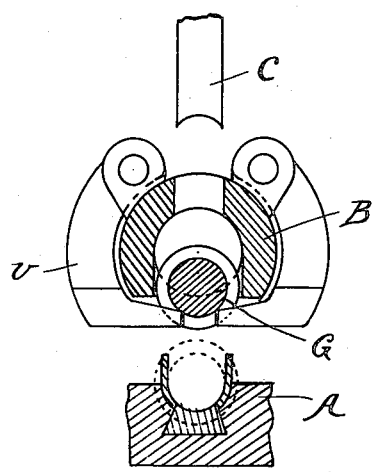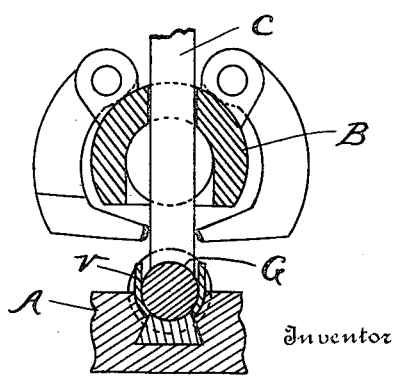

JEREMIAH BINGHAM, OF TOLEDO, OHIO, ASSIGNOR TO THE BOCK BEARING COMPANY, OF TOLEDO, OHIO, A CORPORATION OF OHIO.

FEED MECHANISM.

1,311,590.  Specification of Letters Patent.  Patented July 29, 1919.

Application filed October 17, 1917. Serial No. 197,138.

*To all whom it may concern:*

Be it known that I, JEREMIAH BINGHAM, a citizen of the United States of America, residing at Toledo, in the county of Lucas and State of Ohio, have invented certain new and useful Improvements in Feed Mechanism, of which the following is a specification, reference being had therein to the accompanying drawings.

The invention relates to feed mechanisms for automatic machines in which the articles to be fed are irregularly arranged in the holder. More particularly the invention has reference to a feed mechanism for rollers of roller bearings, and it is the object of the invention to provide means for arranging said rollers in series and maintaining a constant supply thereof, equal to or in excess of the capacity of the machine. To this end the invention comprises the novel construction as hereinafter set forth.

In the drawings:

Figure 1 is a sectional side elevation;

Fig. 2 is a front elevation; and

Fig. 3 is a plan view.

Fig. 4 is an enlarged sectional elevation showing a portion of Fig. 1;

Figs. 5 and 6 are cross sections showing the mechanism for transferring the work from the chute to the housings.

The machine which is fed with the rollers or other articles may be of any construction and design for performing any operation desired. In the construction as illustrated, the purpose of the machine is the placing of the rollers in individual housings or cells and the closing of said cells about the rollers when placed therein. To perform this work it is necessary to feed the housings and the rollers into registration with each other, and this necessitates the assorting and arranging of the rollers in series that they may be successively fed into registration.

In detail, A is a revoluble bed or work carrier for the cells or housings, engaged therewith by means (not shown). B is a chute for carrying the rollers into registration with the housings as they are successively advanced by the rotation of the carrier A, and C is a plunger for forcing each roll from the chute B into the registered housing. D is an inclined chute or holder for a series of regularly-arranged rollers and from which they are successively and individually discharged into the chute B by a trip mechanism E. F is a hopper for holding a supply of irregularly-arranged rollers, which is arranged adjacent to the upper end of the inclined chute D. The specific form of the rollers which are employed is a conical or tapering body G having an enlarged head H and a groove I between said head and the conical body forming a shoulder J. To assort the rolls they must be arranged in substantial parallelism, with their heads adjacent, and the shoulders J on said heads are used for supporting the rolls upon guides for directing them into the chute D. Obviously when the rollers are first placed in the hopper they will be irregularly arranged, extending in all directions, and the first operation to be performed is the arrangement of the rolls in series, this being accomplished as follows.

The hopper F is provided with a bottom portion which inclines from opposite sides toward the central plane of the chute D, as indicated at F' and F² Fig. 2. These bottom portions are also inclined slightly downward from the rear to the front of the hopper, as indicated in Fig. 1. The bottom of the hopper between the portions F' F² is slotted and in this slot is arranged a vertically-reciprocating slotted member K, the upper edge of which is inclined to correspond substantially to the inclination of the hopper bottom. The arrangement is such that when the member K is lowered the rollers will move downward from opposite sides of the inclined bottom, and any roller which approximates parallelism to the slot will drop therein, the small or tapering end extending downward and the enlarged head resting upon the edges of the member K. Such rollers as lie crosswise of the member K will be moved out of the way by the reciprocating movement, and as a consequence several rollers will be engaged with the slot and will be alined with each other with their heads uppermost upon each reciprocation of the member K. In the uppermost position of the reciprocating member K the inclined upper edges K' thereof will be arranged in substantial alinement with the inclined chute D, and as the inclination is outside of the angle of friction, the rollers will slide down from the member K into the chute D. To prevent any wedging an oppositely-inclined latch member L is arranged upon the lower side of the member K and operates as a stop for engaging with the enlarged head of the rollers. This latch member is pivoted at L' and is adapted to engage a stationary stop L² when the member K is in its uppermost position, this causing the tilting of the latch and the release of the heads of the rollers, so that they can slide down the incline into the chute D. Thus from the irregularly-arranged rollers in the hopper a few are picked up and alined in each reciprocation of the member K and are transferred therefrom into the hopper D.

For reciprocating the member K any suitable construction of mechanism may be employed, but as shown a cam M is mounted on a revolving shaft N and is arranged to engage a roller O at the lower end of the member K. The cam is properly timed and fashioned to produce the desired reciprocation of the member K, and the alining capacity of the device is sufficiently in excess of the capacity of the machine which is fed thereby so as to insure a constant supply of rollers in the chute D. There is, however, danger that when the chute D is completely loaded so as to prevent the entrance of more rollers from the member K a wedging will occur which would do injury to the mechanism. This danger is avoided by rendering the reciprocation of the member K intermittent, and controlling the same by the feeding of the rollers so that whenever the chute D is not completely full the member K will be reciprocated, but will be arrested upon the filling of said chute. The arresting of the movement of the member K when in its upper position is effected by means of the latch member L engaging the upper end of a roller which is partially in the chute D and partially in the hopper and projects beyond the upper end of the chute sufficiently to be engaged by the under side of the latch member when the member K begins to descend. It will not be safe to rely upon this lock for holding the member K during the complete cycle of the cam M, for at any instant the feeding of the rolls through the chute D might withdraw the interlocking roller, permitting the member K to drop, with injurious results. I have therefore provided a positive lock, which is thrown into operation during the momentary arresting by the temporary lock and which maintains the member K elevated during the complete cycle. This positive lock comprises a dog P pivoted to the reciprocating member K and having a latch member P² for engaging with a shoulder or detent P³ upon the stationary frame to hold the member K in elevated position. The dog P is normally held in released position by the engagement of the roller P' with the side of the cam M, and as long as the roller O is traveling in contact with the periphery of said cam M the roller P' will maintain contact with the side of the cam. On the other hand, where the member K is held in its uppermost position for an instant by the interlock of a roller, the cam M will move away from the roller O and also from the roller P', permitting the dog P to adjust itself to an angle where the locking is effected. Thus the member K will be positively locked from downward movement until the completion of the cycle, when the reëngagement of the cam M with the roller P' will again release the lock.

In operation the hopper F is filled with rollers which in the first place are irregularly arranged but are successively alined and transferred to the chute D by the mechanism above described. From the chute D the rolls are periodically released by the coöperative reciprocatory movement of fingers Q and R. The finger R holds the last roller of the series and when withdrawn to release the same the finger Q is inserted to hold the column. Both fingers may be actuated from the common reciprocating rod member S.

Each roller when released by the finger R will drop through the curved chute T into alinement with the plunger C. Here it is temporarily retained by hook-shaped fingers U which are forced aside when the plunger is depressed, thereby permitting the roll to drop into the casing V.

What I claim as my invention is:

1. The combination with a hopper for containing an irregularly-arranged mass of headed rollers or similar articles, of an assorting member vertically movable through said hopper, adapted to receive a plurality of alined rollers, a chute for receiving said rollers from said assorting device, and means for locking said assorting member from movement when said chute is full.

2. The combination with a hopper for receiving an irregularly-arranged mass of headed rollers or similar articles, of an assorting member movable vertically through said hopper and having parallelly-arranged spaced walls with inclined upper edges, a chute for registering with said inclined edges in the upper position of adjustment, a cam for raising said assorting member and for controlling the downward movement thereof, means for temporarily arresting movement of said vertically movable member when the chute registering therewith is completely filled, and a lock for positively holding said member in raised position during the cycle of movement of said cam, said lock being actuated by the separation of said cam from said movable member.

3. The combination with a receptacle for an irregularly-arranged mass of headed articles, of a member vertically movable through said receptacle, slotted to receive shanks of said headed articles and having an inclined marginal portion for engaging the heads thereof, a pivoted member for holding the headed articles in the slot during the upward movement of the vertically movable member, and a chute with which said slotted member is registered in its upward movement, adapted to receive the articles sliding out of engagement with said inclined guide.

4. The combination with a receptacle for an irregularly-arranged mass of headed articles, of a member vertically movable through said receptacle, slotted to receive shanks of said headed articles and having an inclined marginal portion for engaging the heads thereof, an oppositely-inclined pivoted member adapted to engage the lowermost headed article upon said inclined marginal portion during the upward movement of the vertically movable member, means for swinging said pivoted member near the end of the upward movement to release said headed article, and a chute with which said slotted member is registered in its upward movement, adapted to receive the articles sliding out of engagement with said inclined guide.

5. The combination with a hopper for containing an irregularly arranged mass of headed articles, of an assorting member vertically movable through said hopper adapted to receive a plurality of alined headed articles, means for moving said assorting member in its upward direction, and means operating upon the separation of said moving means from said assorting member for positively locking said assorting member from movement.

6. The combination with a hopper for containing an irregularly arranged mass of headed articles, of an assorting member vertically movable through said hopper adapted to receive a plurality of alined headed articles, means for moving said assorting member in its upward direction, and means operating upon the separation of said moving means from said assorting member for positively locking said assorting member from movement, said locking means being released upon reëngagement of said moving means with said assorting member.

In testimony whereof I affix my signature.

JEREMIAH BINGHAM.